[11] 3,580,059

| [72] | Inventor | Robert Barry Dalton<br>Monroe, Conn. |
|---|---|---|
| [21] | Appl. No. | 790,645 |
| [22] | Filed | Jan. 13, 1969 |
| [45] | Patented | May 25, 1971 |
| [73] | Assignee | United Aircraft Corporation<br>East Hartford, Conn. |

[54] SPHERICAL BEARING TESTER
26 Claims, 11 Drawing Figs.

[52] U.S. Cl..................................................... 73/71.5,
73/432
[51] Int. Cl..................................................... G01m 13/04
[50] Field of Search........................................... 73/9, 10,
67, 67.3, 67.4, 71.5, 90, 91, 92, 93, 118, 432

[56] References Cited
UNITED STATES PATENTS
932,567  8/1909  O'Connor........................ 73/9

| 2,787,905 | 4/1957 | Prestipino................... | 73/67 |
|---|---|---|---|
| 3,287,966 | 11/1966 | Haan........................... | 73/67X |
| 3,332,277 | 7/1967 | Blinder........................ | 73/67 |

*Primary Examiner*—Richard C. Queisser
*Assistant Examiner*—C. E. Snee, III
*Attorney*—Vernon F. Hauschild ABSTRACT: A spherical bearing tester providing oscillatory rotating motion of the inner bearing race with respect to the outer bearing race about the thru-shaft longitudinal axis, also providing an oscillatory relative motion between the outer and inner races about an axis perpendicular to the thru-shaft longitudinal axis, also providing a bearing load along the axis of the thru-shaft, and also providing a bearing load so as to cause the outer race to attempt to move with respect to the inner race as a result of a force which is perpendicular to both the thru-shaft longitudinal axis and the axis about which the outer race oscillates with respect to the inner race.

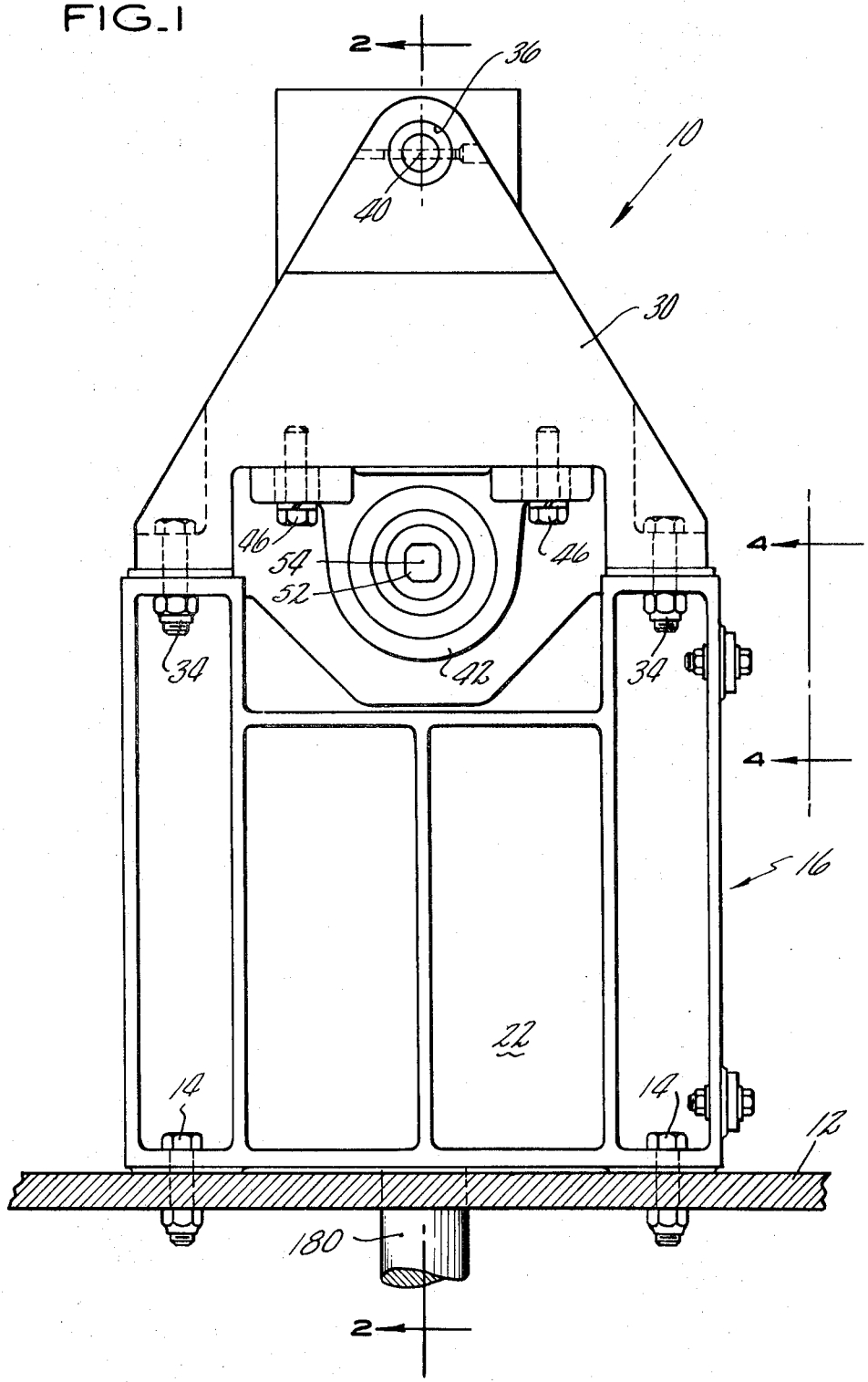

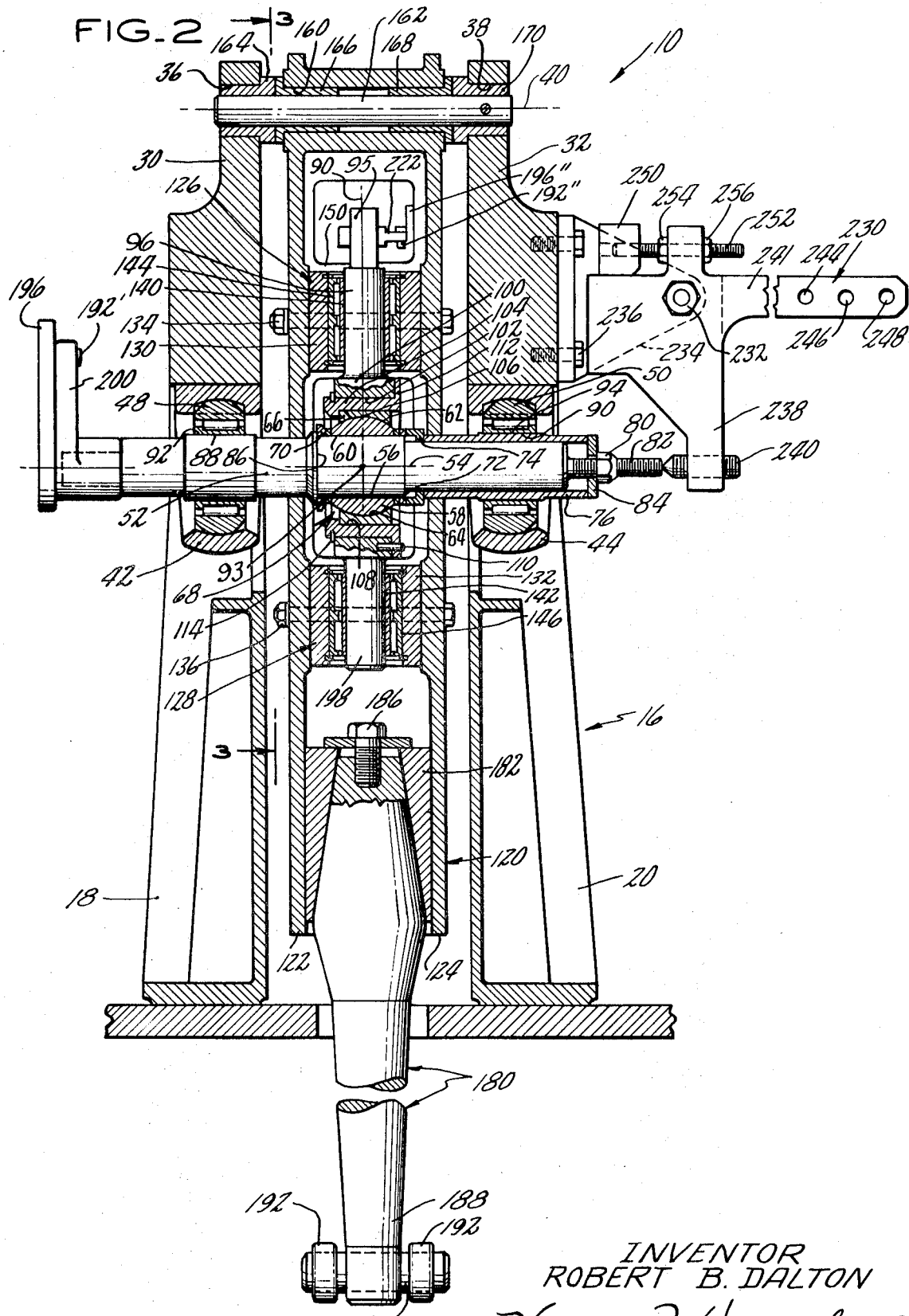

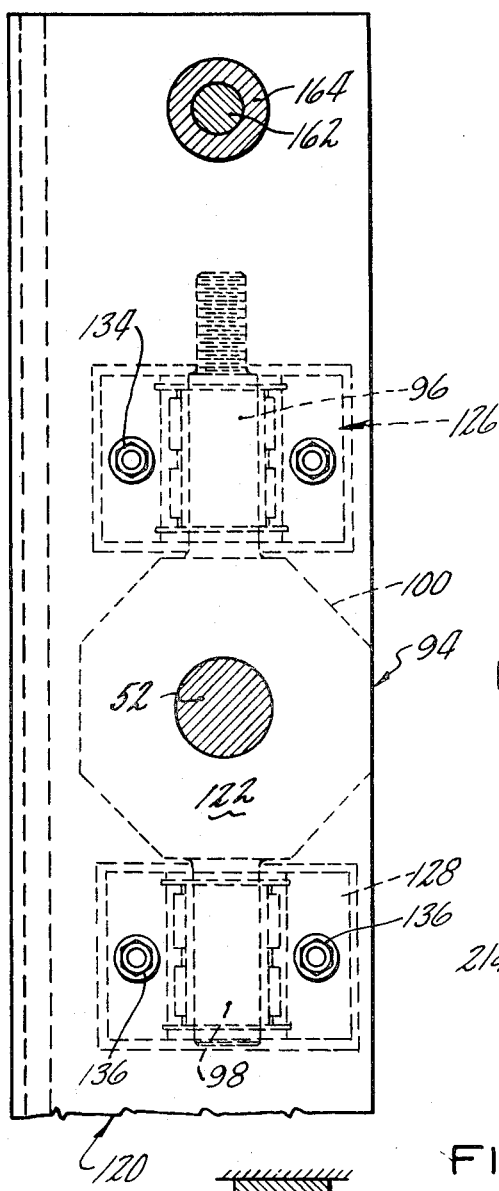
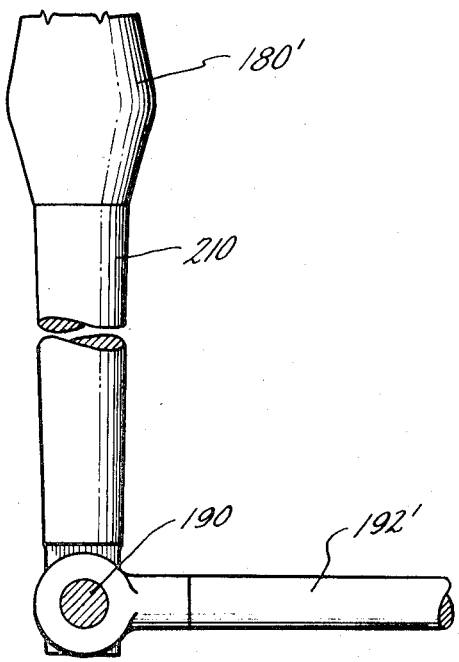
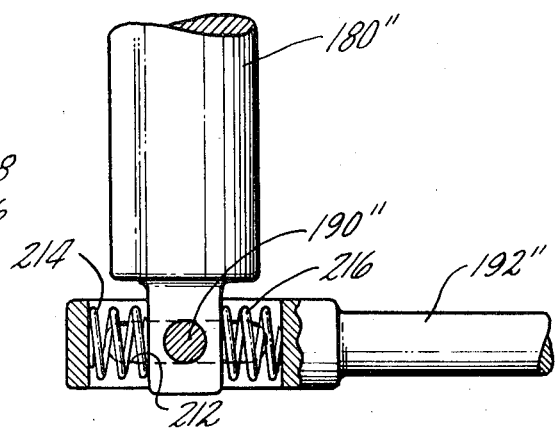
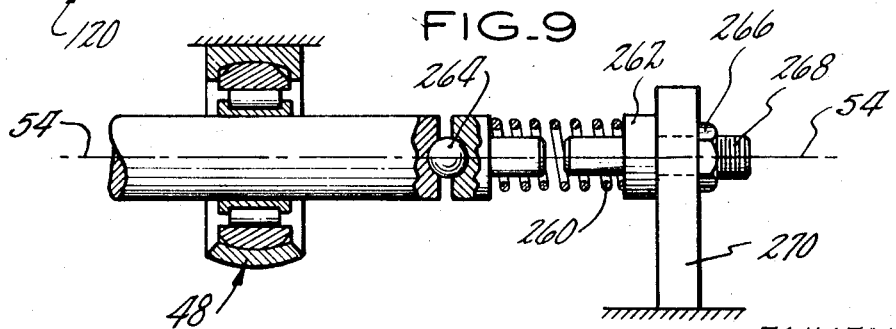

FIG_4
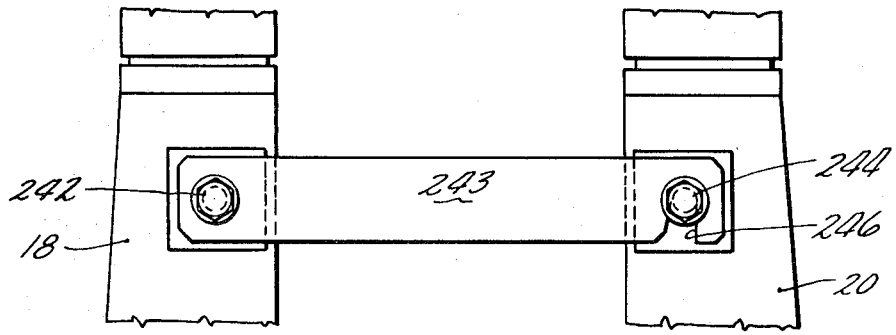
FIG_5
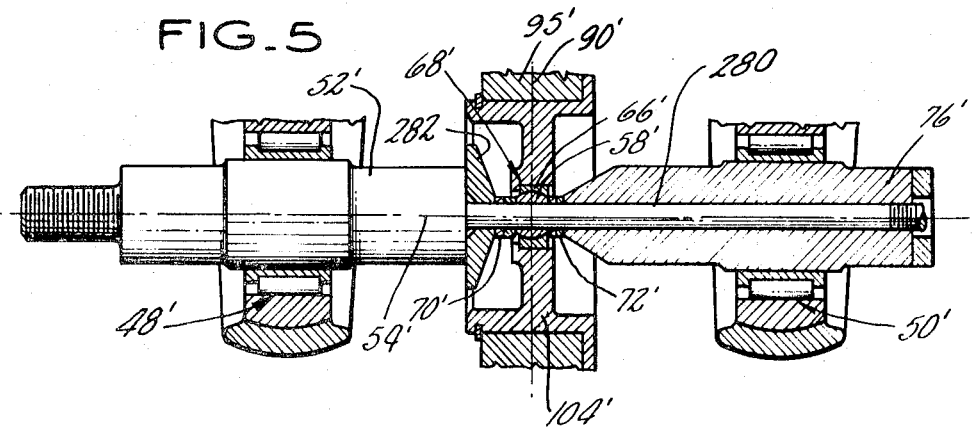
FIG_6
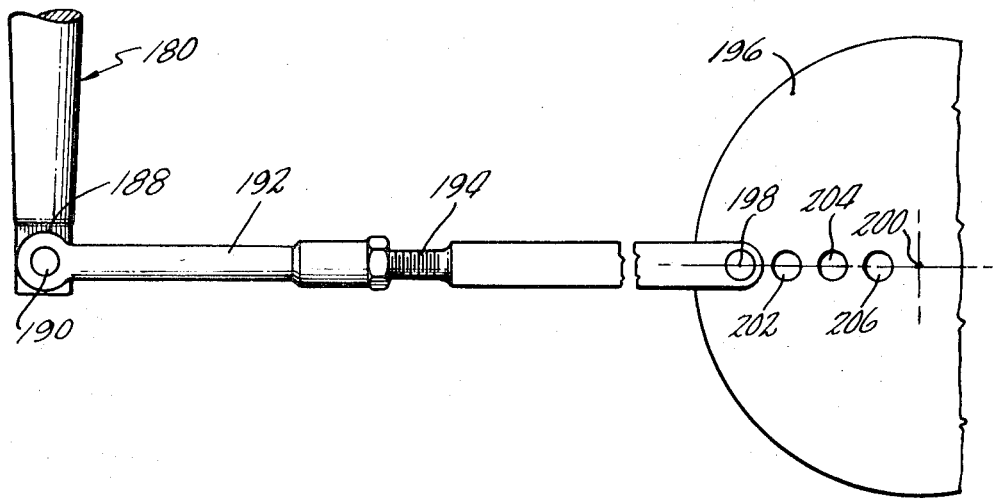
INVENTOR
ROBERT B. DALTON
BY Vernon F. Hanschild
ATTORNEY INVENTOR
ROBERT B. DALTON
BY Vernon F. Hauschild
ATTORNEY

SPHERICAL BEARING TESTER

BACKGROUND OF THE INVENTION

1. Field of Invention

This invention relates to a spherical bearing tester and more particularly to a spherical bearing tester adapted to test a spherical bearing having an inner race with a spherical outer surface and a center bore through which a thru-shaft extends and an outer race having a spherical inner surface in mating relation with the outer surface of the inner race. This bearing tester has the capability of providing an oscillatory rotary motion of the inner race within the outer race about the longitudinal axis of the thru-shaft and an oscillatory rotary motion of the outer race with respect to the inner race about an axis perpendicular to the thru-shaft longitudinal axis. The tester further has provisions for applying a load to the inner race along the thru-shaft longitudinal axis and for applying a second load to the outer race in a direction perpendicular to the thru-shaft longitudinal axis and the axis of oscillation of the outer race.

2. Description of the Prior Art

In the bearing tester art, there are many testers for use with conventional antifriction and plain bearings which provide for the continuous rotation of a shaft within a plain bearing or the continuous rotation of a shaft and antifriction bearing inner race with respect to the antifriction bearing outer race with the bearing under load. These conventional bearing testers are not usable to test spherical bearings, however, since spherical bearings are normally used as joints between loaded parts, such as shafts or rods, which are subjected to relative oscillatory motion only, as opposed to continuous relative rotation in one direction.

In the spherical bearing tester art, spherical bearing testers are known which produce an oscillating rotary motion of the inner race within the outer race about the longitudinal axis of the thru-shaft and while this is adequate for certain applications, it is inadequate for applications such as testing spherical bearings which are intended to be used on push rods of helicopter rotors. These push rods extends between the helicopter rotor swashplate and the pitch horns of each blade and have several loads and motions applied thereto. These spherical bearings have a centrifugal load applied thereto by the rotation of the rotor about its axis of rotation. In addition, due to continuous blade cyclic pitch variation during rotor rotation, the inner race of the bearing is caused to oscillate within the outer race of the bearing about the inner race thru-shaft which is substantially perpendicular to the longitudinal axis of the pitch control push rod. Still further, due to the lead-lag motion of each blade, a second oscillatory motion is established between the inner and outer races about an axis substantially perpendicular to the thru-shaft longitudinal axis and the longitudinal axis of the push rod. Still further, due to the flapping action of each blade, the magnitude of this second oscillatory motion is determined. Since the blade lead-lag motion, the blade flapping motion and the blade cyclic pitch change motion are oscillatory, the load imposed across the spherical bearing by each is called an oscillating or vibrating load. In addition to these oscillating loads, blade aerodynamic loading and blade collective pitch changes impose steady state loads on these spherical bearings. It will therefore be seen that these spherical bearings are subjected to centrifugal loading, two forms of oscillatory loading and other forms of steady state loading and therefore the aforementioned bearing test rig is inadequate to properly test a spherical bearing intended for use in the helicopter rotor head and other present day environments.

While there are other spherical bearing testers which are capable of imposing some of these loads and motions, none impose the aforementioned centrifugal load along the thru-shaft longitudinal axis and none utilize a simple mechanism to impart the steady state and/or vibratory loads by tending to cause the outer race to move relative to the inner race along an axis perpendicular to the two perpendicular axes about which relative oscillatory motion occurs between the inner and outer spherical bearing races due to such actions as the cyclic pitch variation and the lead-lag motion of the blades in helicopter rotors.

SUMMARY OF INVENTION

A primary object of the present invention is to provide a spherical bearing tester which produces oscillatory motion between the inner and outer races about the longitudinal axis of the thru-shaft and also about a second axis perpendicular thereto and wherein loads may be imposed upon the bearing both along the longitudinal axis of the thru-shaft and along an axis perpendicular to the aforementioned axes of relative rotation.

In accordance with the present invention, load is applied to the bearing by pivotal motion between the test support mechanism which supports the inner race and the test support mechanism which supports the outer race of the bearing with the force being applied in such a way to cause the outer race to move or attempt to move with respect to the inner race.

In accordance with the further aspect of the present invention, the oscillatory motions and loads are applied to the spherical bearing by operation of eccentric mechanisms with the throw of the eccentric mechanisms being variable to vary the amount or degree of oscillation.

In accordance with still a further aspect of this invention, both steady state and oscillating loads may be applied to the bearing along an axis perpendicular to the two perpendicular axes of relative rotation between the bearing races.

In accordance with still a further aspect of the present invention, a steady state load can be applied to the bearing along the axis of the thru-shaft by either a variable spring or a bell-crank which is counterweighted to produce no load until desired.

In accordance with a still further aspect of the present invention, vibratory or oscillatory loads can be applied to the bearing either through a bending beam or a spring suspension system.

BRIEF DESCRIPTION OF THE DRAWINGS

FIG. 1 is a side view of my spherical bearing tester rig.

FIG. 2 is a view taken along line 2-2 of FIG. 1.

FIG. 3 is a view taken along line 3-3 of FIG. 2 to illustrate portions of the interior of my bearing tester rig.

FIG. 4 is a view taken along line 4-4 of FIG. 1.

FIG. 5 is a view showing an adapter mechanism which may be utilized with my spherical bearing tester rig to test bearings of different sizes.

FIG. 6 is a view showing the preferred connection between the load imposing shaft in my bearing tester and the variable throw eccentric drive to which it is connected, as well as the fixed load adjustment member associated therewith.

FIG. 7 shows the load imparting shaft in my bearing tester in the form of a bending beam to permit imparting oscillating or vibratory loads to the bearing under test.

FIG. 8 corresponds to FIG. 7 but the load imparting beam is spring suspended rather than utilizing the bending beam of FIG. 7.

FIG. 9 shows an alternate method of imposing a steady state load along the longitudinal axis of the thru-shaft of the bearing being tested.

DESCRIPTION OF THE PREFERRED EMBODIMENT

Figure 10:
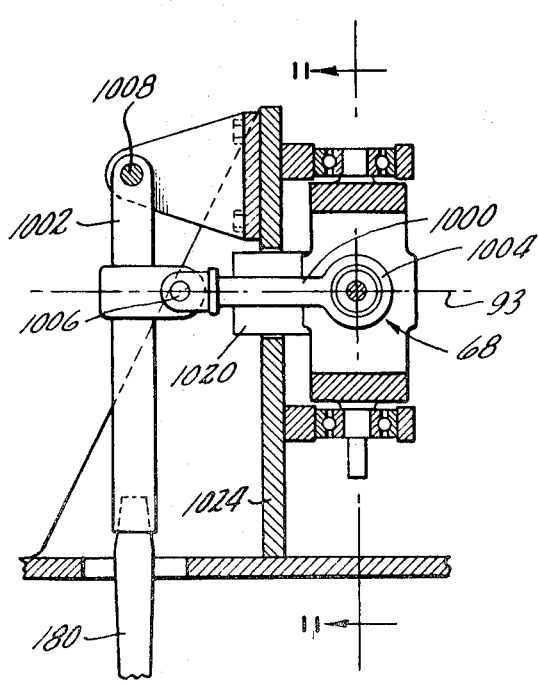
FIG. 10 is a side view of a modified form of my invention.

Referring to FIGS. 1 and 2 we see spherical bearing tester 10 which is preferably adapted to be mounted from a table or platform such as 12 in a conventional fashion such as by bolt-nut units 14. Tester 10 comprises load support assembly 16 which includes left and right structural members 18 and 20 which are joined through web section such as 22 at their opposite ends so that load support assembly 16 is substantially rectangular in cross section and is fixedly attached to platform 12. Load support assembly 16, in turn, supports left-hand and right-hand side support assemblies 30 and 32 in spaced relation as best shown in FIG. 2. These side support assemblies 30 and 32 are connected to the load support assembly in any convenient fashion such as bolt and nut members 34. It will be noted that side support assemblies 30 and 32 are substantially triangular in shape and include aligned apertures 36 and 38 which are concentric to pivot axis 40. Pillow blocks 42 and 44 are attached to side support assemblies 30 and 32, respectively, by any convenient mechanism such as bolts 46 in tapped holes and include bearing members 48 and 50 which will serve to support thru-shaft 52 in position. Thru-shaft 52 has a longitudinal axis 54 and extends through the central bore 56 of spherical bearing inner race 58 and carries the inner race therewith in the same fashion that a pitch horn of a helicopter rotor blade or other thru-shaft mechanisms serve to support the spherical bearing inner race 58. Bearing inner race 58 includes cylindrical inner surface 60, which is concentric about axis 54, and outer spherical surface 62 which engages the inner spherical surface 64 of outer race 66 of the spherical bearing 68, which includes inner and outer race 58 and 66. As best shown in FIG. 2, spacer rings 70 and 72 are positioned on opposite sides of inner race 58 and cooperate with ring member 74 and sleeve 76 to positively position inner race 58 on shaft 52 for motion therewith along longitudinal axis 54 and for rotary motion therewith about axis 54. This positive positioning occurs because nut member 80 threadably engages threaded projection 82 of shaft 52 and, as the nut is tightened, it acts through washer 84 to cause sleeve 76, spacer rings 74, 72, inner race 58 and spacer ring 70 to bear against one another and finally against shoulder 86 on shaft 52 to thereby positively position inner race 58 on shaft 52. Due to the support between the inner surfaces 88 and 90 of pillow block bearings 48 and 50 and the outer cylindrical surfaces 92 and 94 of shaft 52 and sleeve 76, respectively, it will be observed that shaft 52 and hence bearing inner race 58 is fixably mounted except to be capable of rotary or oscillatory rotary motion about axis 54 and motion along axis 54. The manner of imposing this oscillatory and translatory motion will be described hereinafter.

As stated previously, outer race 66 is mounted so as to be movable with respect to inner race 58 and that mounting will now be described. Outer race 66 is supported so as to be in mating relation with inner race 58 and so as to be relatively rotatable in oscillatory fashion with respect thereto about axis 90, which is perpendicular to axis 54 and to be movable with respect thereto about axis 40 and along line 93 in load imposing fashion, which axis or line 93 is perpendicular to both axes 54 and 90. The oscillatory rotary motion about axis 90 is accomplished by supporting outer race 66 in support structure or vertical shaft assembly 95 which, as best shown in FIGS. 2 and 3 includes aligned shafts 96 and 98 projecting on opposite sides of central member 100 which includes central bore 102 to receive and support bearing adapter sleeve 104. The inner cylindrical surface 106 of sleeve 104 engages the outer cylindrical surface 108 of outer race 66. Sleeve 104 is prevented from rotating within vertical shaft assembly 95 by positioning pin 110 and is otherwise held in position within support 95 by its own peripheral flange 112 and snap ring 114. Vertical shaft assembly 95 is positioned in structural member or bracket 120, and in particular in between spaced walls 122 and 124 thereof by bearing assemblies 126 and 128. Bearing assemblies 126 and 128 include support blocks 130 and 132, which are held in position between walls 122 and 124 by bolt-nut assemblies 134 and 136, and support bearings 140 and 142 within bearing sleeves 144 and 146, respectively. Bearings 140 and 142 engage the cylindrical section of shafts 96 and 98 so as to permit oscillatory rotary motion of vertical shaft assembly 95 and hence outer race 66 about axis 90. It will be noted that outer race 66 is positioned concentrically about axis 54 and so that the midlongitudinal point of outer race 66 and inner race 58 are positioned on axis 90.

It will therefore be seen that in view of the support and positioning functions performed by the mechanism just described, thru-shaft 52 and inner race 58 may be rotated within outer race 66 about axis 54 in oscillatory fashion and along axis 54. In addition, outer race 66 may be rotated in oscillatory fashion with respect to inner race 58 about axis 90. This therefore gives us oscillatory motion capabilities between the inner and outer races of spherical bearing 68 about perpendicular axes 54 and 90.

With respect to imposing loads upon spherical bearing 68, it will be noted that bracket 120 includes cylindrical aperture 160 at its upper end which aligns with apertures 36 and 38 of side support assemblies 30 and 32 to receive pivot pin 162 therewithin so as to permit pivotal motion about pivot axis 40 between side support assemblies 30 and 32 and bracket 120, and hence between the bearing inner race 58 and the bearing outer race 66. Bushings 164, 166, 168, and 170 cooperate to produce a smooth pivot motion. Axes 40 and 54 are designed to be parallel and, accordingly, as bracket 120 and hence outer race 66 are caused to pivot about axis 40 with respect to support assemblies 30 and 32 and hence bearing inner race 58, a load will be imposed across the races along axis or line 93 which is perpendicular to axes 40, 54, and 90.

This load is actually applied by the action of applicator shaft 180 which is connected to the opposite end of bracket 120 from axis 40 so that bearing 68 is intermediate the point of load application to the bracket and the pivot axis of the bracket. Shaft applicator 180 is shaped to be conical at its engagement end and is received in a taper block 182 of bracket 120. Taper block 182 is positioned between walls 122 and 124 and may be held in position by any convenient means such as a weld or nut and bolt fixings. Bolt 186 threadably engages shaft 180 so as to force the tapered end thereof in tight mating engagement within taper block 182 and thereby positively positions shaft 180 in bracket 120. The opposite end 188 of shaft 180 is connected to a load imposing device which is capable of providing both an oscillatory or vibratory load and/or a steady state load. This load imposing device is positioned to impose a load on shaft 180 either into or out of the plane of FIG. 2 and therefore perpendicular to axis 40.

Referring to FIG. 6, we see the manner in which the load is applied to the bearing through applicator shaft 180 and bracket 120. The end 188 of shaft 180 is pivotally connected about pivot pin 190 to yoke member 192. Yoke member 192 includes adjustable expansion joint 194 and is connected at its opposite end to motor driven eccentric drive 196 at pivot pin 198. In conventional eccentric fashion, as eccentric drive member 196 is driven in rotation about axis 200, yoke 192, and hence applicator shaft 180 are caused to oscillate. The amount of travel of oscillation is determined by the stroke of yoke 192, which is in turn determined by the radius of pivot 198 from axis 200, that is, the throw of the eccentric. Apertures such as 202, 204, and 206 are provided at varying distances from axis 200 to which pivot pin 198 of yoke 192 may attach to vary the throw of the eccentric and therefore the amount of oscillation imparted to applicator shaft 180 by yoke 192. Expansion joint 194 performs the function of permitting a steady state load to be applied to bearing 68 by applicator shaft 180. This is accomplished by expanding yoke 192 through the action of expansion joint 194 to impose any desired amount of load upon bearing 68 through applicator shaft 180 when the eccentric is in neutral, that is, when pivot pin 198 is positioned at axis 200. Accordingly, by the action of eccentric member 196 and yoke 192, applicator shaft 180 is capable of providing a steady state load to bearing 68 due to the action of expansion joint 194, or oscillatory load to bearing 68 by the action of eccentric drive 196 or both.

Those skilled in the art will realize that this load could also be applied by the use of a conventional link-toggle arrangement.

It is deeded desirable to use applicator shafts 180 of different diameters for different load applications to insure that the bending stresses in the shaft or bear 180 are kept within acceptable limits.

While applicator shaft or beam 180 is shown in FIGS. 2, 6, and 7 to be fabricated to include a bending beam section 210 which acts to impose this vibratory load on bearing 68 through applicator shaft 180 as yoke 192 is caused to move by a drive mechanism comparable to eccentric 196 of FIG. 6, by viewing FIG. 8 we will see a modification of this applicator shaft. In this modification the applicator shaft 180'' is substantially more stiff such that it will tend not to bend and the deflection caused by the substantially linear displacement of yoke 192'' is seen by the springs 214 and 216, thus imposing a load on the end of applicator shaft 180''.

With this method of load application eccentrically driven yoke 192'' is pivotally connected to applicator shaft or beam 180'' in such a fashion that pivot pin 190'' is relatively movable in slots 212 of yoke 192 to permit opposed springs 214 and 216 to act on opposite sides of applicator shaft or beam 180''.

Shaft members 52 and 95 may be caused to oscillate about axes 54 and 90, respectively, by the action of eccentric drives of the type described in connection with FIG. 6 but which will not be redescribed so as to avoid repetition. The only difference would be that eccentric applicator 196' for shaft 52 will connect through a yoke comparable to 192' to crank arm 200 in pivotable fashion so as to impose an oscillatory motion to shaft 52. In similar manner, eccentric drive 196'' will connect to shaft 95 through yoke 192'' and crank arm 222.

In addition to the two oscillatory motions which can be imparted to the spherical bearing about perpendicular axes 54 and 90 and the oscillatory and steady state load which can be applied thereto along a line 93 perpendicular to the perpendicular axes, an additional steady state load comparable to the centrifugal load in a helicopter rotor can also be applied to bearing 68. The mechanism for doing this is shown in FIG. 2 and includes bellcrank member 230 which is pivotably connected by pivot pin 232 to bracket 234, which is in turn fixably connected to right-hand load support member 32 by any convenient connecting means such as bolt mechanism 236. Bellcrank member 230 includes perpendicular arms 238 and 241. With bellcrank 230 positioned as shown in FIG. 2, arm 238 extends perpendicular to and intercepts axis 54 of shaft 52 and bearing 68, and in particular inner race 58 thereof, and carries pointed pin member 240 in threaded engagement therewithin so as to be aligned with axis 54. Arm 241 extends in spaced relation to and parallel to axis 54 and includes a plurality of apertures 244, 246, and 248 at varying distances from pivot pin 232 and which are adapted to receive test weights of selected weight so as to impose a moment about pivot pin 232, which moment is also imposed against shaft 52 and inner race 58 by arm 238. To insure the accuracy of this steady state load being applied along axis 54 to shaft 52 and inner race 58, counterweight 250 is connected to bellcrank 230 by threaded shaft 252 and its distance from pivot pin 232 may be varied by the action of threaded shaft 252 and nuts 254 and 256 to insure that no load is imposed upon shaft 52 by bellcrank 230 when in its unloaded or unweighted condition.

FIG. 9 shows a second method of applying this steady state load to shaft 52 and inner race 58 along axis 54. The FIG. 9 embodiment includes adjustable spring 260 which extends between spring retainers 262 and 264 and which is adjustable tensionwise or compressionwise by the action of nut 266 and threadable extension 268, which extends through a threaded aperture in fixed support 270. Support 270 may connect in any convenient fashion to load support assembly 16 or members 30 or 32.

Spherical bearing tester 10 has the capability of testing spherical joints of different diameters and this is best shown in FIG. 5 wherein shaft 52' is positioned within pillow block bearings 48' and 50' so as to be rotatable and translatable about axis 54'. In the !fig. 5 embodiment the inner race 58' of spherical bearing 68' is positioned on necked down portion 280 of shaft 52' and is held in position by ring spacers such as 70' and 72' which are positioned on opposite sides of inner race 68' and which are in turn held in position by adapter spacer 282 and sleeve 76'. In all other respects, inner race 58' is mounted and actuated as in the FIG. 2 construction. Outer race 66' is also mounted precisely as shown and described in connection with the FIG. 2 construction except that a special bearing retainer ring 104' is supported from vertical shaft assembly 95' to support the smaller outer race 66' for rotation about axis 90', which is perpendicular to axis 54'. The loads are applied to bearing 68' in the same fashion as described in connection with the FIG. 2 construction.

For support purposes it may be desirable to extend one or more support latches 243 between the side frames 18 and 20 of load support assembly 16 as best shown in FIG. 4. As shown, latch 243 is pivotally connected to member 18 at pivot pin 242 and is connected to pin 244 in member 20 by passing detent 246 thereover. This retractable support bar or bracket 243 is desirable because it permits direct access to bracket 120, vertical shaft assembly 95, and bearing 68 within the support frame members 16, 30, and 32.

Figure 11:
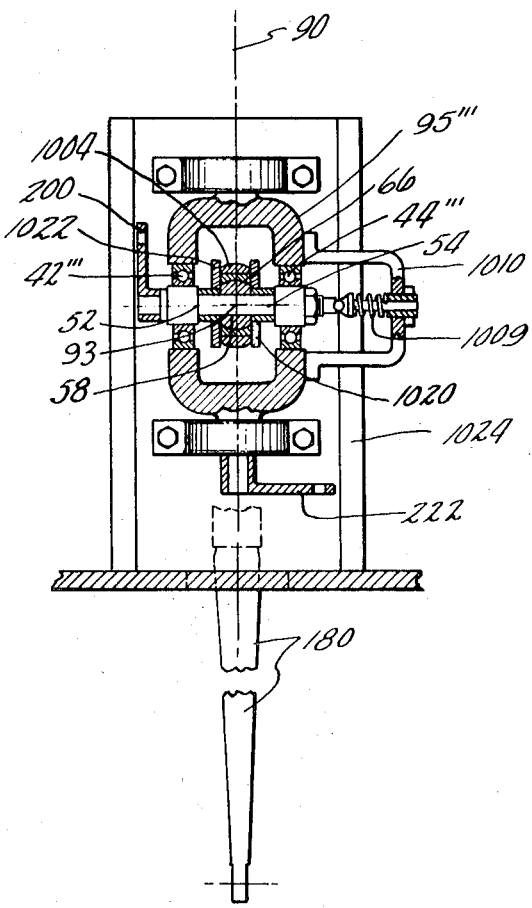
FIG. 11 is a view taken along line 11-11 of FIG. 10.

From the description just given it will be seen that the spherical bearing tester taught herein includes provisions for oscillatory rotary motion between the bearing races about perpendicular axes 54 and 90 and provides for both steady state and/or oscillating load application across the bearing along a line or axis 93 perpendicular to the perpendicular axes 54 and 90 and also provides for an application of steady state load to the bearing along axis 54. The oscillatory rotary motion of inner race 58 within outer race 66 about axis 54 corresponds to the blade cyclic pitch variation motion in a helicopter rotor. The oscillatory rotary motion of outer race 66 about inner race 58 and about axis 90 substantially corresponds to the blade lead-lag motion in a helicopter rotor. The load imposed along axis 93 corresponds to the load imposed by blade collective and cyclic pitch variation and blade aerodynamic loading in a helicopter rotor. The load imposed along axis 54 corresponds to the centrifugal load imposed in a helicopter rotor during rotation. Referring to FIGS. 10 and 11, we see a modification of my spherical bearing tester and corresponding part numbers are accordingly used. The FIG. 10 and 11 modification differs from the previously described embodiment in that the bearing inner race 58 is supported so as to be oscillatable with respect to the bearing outer race 66 not only about axis 54 as in the previously described embodiment but also about axis 90 which is perpendicular thereto. The FIG. 10 and 11 embodiment accordingly differs from the earlier embodiment in that in the earlier embodiment the bearing outer race 66 oscillates with respect to the bearing inner race 58 about axis 90, whereas in the FIG. 10 and 11 embodiment, the inner race 58 oscillates with respect to the outer race 66 about axis 90.

Referring to FIGS. 10 and 11 we see that bearing outer race 66 is supported in eye 1004 of loading link 1000 which is, in turn, pivotally connected by pivot pin 1006 to bracket 1002. Shaft load applicator 180 is attached to bracket 1002 in a similar fashion as to bracket 120 in FIG. 2. Bracket 1002 pivots about axis 1008 in a similar fashion to bracket 120 about axis 40 in FIG. 2. A steady state or oscillatory load will be imposed through shaft 192 by mechanism comparable to eccentric 196 of FIG. 6 so as to impose such a load on the bearing along axis 93.

Vertical shaft assembly 95''' supports pillow blocks or bearings 42''' and 44''' such that when assembly 95''' is caused to oscillate about axis 90 by input 222, the bearing inner race 58 and the centrifugal loading assembly 1010 all oscillate about axis 90 within outer race 66. It will accordingly be seen that outer race 66 remains stationary with respect to the load along axis 93, rather than oscillating as in the FIG. 2 design. Input 200 causes inner race 58 to oscillate about axis 54 and spring assembly 1009, which is part of centrifugal loading applicator 1010, imparts a steady load on inner bearing 58 along axis 54. Plates 1020 and 1022 are suitably connected to main frame 1024 and allow a close clearance fit between the loading link 1000 and of the two plates 1020 and 1022. These plates serve to guide link 1000 and hence axially locate the spherical bearing 68. These plates react the centrifugal load applied to the bearing assembly by load applicator 1010.

It will accordingly be seen that in the FIG. 10 and 11 construction, a steady state or oscillatory load is imposed on outer race 66 along axis 93 by load applicator shaft 82 and that a centrifugal load is imposed upon inner race 58 along axis 54 by load applicator 1010. Inner race 58 is caused to oscillate with respect to the outer race 66 about axis 54 by input member 220 and about axis 90, which is perpendicular to axis 54 and 93, by motion applicator 222.

I wish it to be understood that I do not desire to be limited to the exact details of construction shown and described, for obvious modifications will occur to a person skilled in the art. For example, the eccentric drive mechanisms 196, 196', and 196" could be replaced by servo operated air piston and cylinder assemblies, pillow blocks 42 and 44 could be replaced by any conventional shaft support mechanism, and pivotable bracket 243 could be replaced by a threadably engaging thru-bolt member.

I claim:

1. A spherical bearing tester to test a spherical bearing which includes an inner race having a spherical outer surface and a center bore to receive the shaft on which the inner race is to be mounted and an outer race enveloping the inner race and having an inner spherical surface in mating relation with the outer spherical surface of the inner race including:
   a. a shaft member shaped to extend through and support the bearing inner race for motion therewith,
   b. means to support said shaft member for oscillatory motion about its longitudinal axis,
   c. first means to move said shaft member in oscillatory rotary motion about its longitudinal axis,
   d. a support member supporting the bearing outer race in mating relation with the bearing inner race,
   e. means to support said support member for oscillatory rotary motion about a second axis perpendicular to the shaft longitudinal axis,
   f. second means to move said support member in oscillatory rotary motion about said second axis,
   g. and means to impose a load on said support member along an axis perpendicular to the shaft longitudinal axis and to the second axis so as to cause said support member and hence the bearing outer race to move with respect to the inner race and hence load said races.

2. Apparatus according to claim 1 wherein said load imposing means imparts both a steady state and an oscillatory load to said support member.

3. Apparatus according to claim 1 and including means to impose a load on said shaft along said shaft longitudinal axis.

4. Apparatus according to claim 3 wherein said last named load imposing means is an adjustable spring.

5. Apparatus according to claim 3 wherein said load imposing means is a bellcrank member pivotally supported from said first means including:
   a. a first arm extending substantially perpendicular to said shaft longitudinal axis and having an end in alignment therewith,
   b. a second arm extending substantially parallel to said shaft longitudinal axis and,
   c. means to support testing weights from said second arm at selected distances from the bellcrank pivot axis so as to impose a moment about said bellcrank member pivotal axis, which moment acts upon said shaft through said first arm.

6. Apparatus according to claim 5 and including counterweight means cooperating with said bellcrank member so that said bellcrank member imposes no load upon said shaft when unloaded.

7. Apparatus according to claim 1 wherein said load imposing means includes:
   a. a pivotal member mounting said support member and pivotally connected to said first means about an axis parallel to and offset from said shaft longitudinal axis and including means to impose a force on said pivotal member at a point on the opposite side of said shaft from the pivotal axis of the pivotal member.

8. Apparatus according to claim 7 wherein said means to impose a force on said pivotal member is a shaft member extending along an axis substantially perpendicular to the pivotal member pivotal axis and positioned on the opposite side of said shaft from said pivotal axis and further including a driven eccentric member connected to said shaft member and adapted to impose oscillatory loads on said shaft in a direction perpendicular to said shaft axis and said pivot member pivot axis as said eccentric member rotates.

9. Apparatus according to claim 8 and including means connected to said eccentric member to impose a steady state load upon said shaft at all times.

10. Apparatus according to claim 1 where said shaft support means and said support member support means are removably attached to said tester so that shaft member and said support member are replaceable to permit the testing of a spherical bearing of any size.

11. A spherical bearing tester to test a spherical bearing which includes an inner race having a spherical outer surface and a center bore to receive the shaft on which the inner race is to be mounted and an outer race enveloping the inner race and having an inner spherical surface in mating relation with the outer spherical surface of the inner race including:
   a. a shaft member shaped to extend through and support the bearing inner race for motion therewith,
   b. first means to move said shaft member for oscillatory rotary motion about its longitudinal axis,
   c. support means adapted to support the bearing outer race in mating relation with the bearing inner race,
   d. second means to establish relative motion between the inner and outer races about a second axis perpendicular to the shaft longitudinal axis,
   e. and means to impose a load on said shaft and hence said inner race along the shaft longitudinal axis.

12. A spherical bearing tester adapted to test spherical bearings which include an inner and an outer race having a spherical interface therebetween comprising:
   a. means to support the inner bearing race,
   b. means to support the outer bearing race,
   c. and means pivotally connecting said support means to permit load imposing relative pivotal motion therebetween and between said races.

13. Apparatus according to claim 12 wherein said inner race supporting means is stationary and said outer race supporting means is pivotally movable with respect thereto.

14. Apparatus according to claim 12 wherein said inner bearing race support means includes a load support assembly having spaced walls supporting a thru-shaft adapted to extend through the bore of the spherical bearing inner race and having at least one pivotable support latch extending between said support walls.

15. Apparatus according to claim 12 and including means to cause said inner race to oscillate about a first axis within said outer race, and means to cause relative oscillation between said races about a second axis perpendicular to said first axis.

16. Apparatus according to claim 27 and including means to impart a load to said inner race along said first axis.

17. A spherical bearing tester adapted to test a spherical bearing which includes an inner race having a spherical outer surface and a center bore to receive the shaft on which the inner race is to be mounted and an outer race enveloping the inner race and having an inner spherical surface in mating relation with the outer spherical surface of the inner race including:
   a. a shaft member adapted to extend through and support the bearing inner race for motion therewith,
   b. first means to move said shaft member for oscillatory rotary motion about its longitudinal axis,
   c. a support member adapted to support the bearing outer race in mating relation with the bearing inner race,
   d. second means to support said support member for oscillatory rotary motion about a second axis perpendicular to the shaft longitudinal axis, e. means to impose a load along an axis perpendicular to the shaft longitudinal axis and to the second axis so as to cause said support member and hence the bearing outer race to move with respect to the inner race, f. means to cause said shaft and hence the bearing inner race to oscillate about the shaft longitudinal axis and, g. means to cause said support member and hence the bearing outer race to oscillate about said second axis.

18. A spherical bearing tester adapted to test a spherical bearing which includes an inner race having a spherical outer surface and a center bore to receive the shaft on which the inner race is to be mounted and an outer race enveloping the inner race and having an inner spherical surface in mating relation with the outer spherical surface of the inner race including:

a. a shaft member adapted to extend through and support the bearing inner race for motion therewith, b. first means to support said shaft member for oscillatory rotary motion about its longitudinal axis, c. a support member adapted to support the bearing outer race in mating relation with the bearing inner race, d. second means to support said support member for oscillatory rotary motion about a second axis perpendicular to the shaft longitudinal axis, e. means to impose a load along an axis perpendicular to the shaft longitudinal axis and to the second axis so as to cause said support member and hence the bearing outer race to move with respect to the inner race, f. means to impose a load on said shaft along said shaft longitudinal axis, g. means to cause said shaft and hence the bearing inner race to oscillate about the shaft longitudinal axis and, h. means to cause said support member and hence the bearing outer race to oscillate about said second axis.

19. A spherical bearing tester to test a spherical bearing which includes an inner race having a spherical outer surface and a center bore to receive the shaft on which the inner race is to be mounted and an outer race enveloping the inner race and having an inner spherical surface in mating relation with the outer spherical surface of the inner race including:

a. a shaft member shaped to extend through and support the bearing inner race for motion therewith, b. first means supporting said shaft member for oscillatory rotary motion about its longitudinal axis, c. means to move said shaft member in oscillatory rotary motion about its longitudinal axis, d. support means supporting the bearing outer race in mating relation with the bearing inner race, e. second means to establish relative motion between said inner and outer races about a second axis perpendicular to the shaft longitudinal axis, f. and means to impose a load on said support means along an axis perpendicular to the shaft longitudinal axis and to the second axis to cause said support means and hence the bearing outer race to move with respect to the inner race to thereby load the races.

20. A spherical bearing tester to test a spherical bearing which includes an inner race having a spherical outer surface and a center bore to receive the shaft on which the inner race is to be mounted and an outer race enveloping the inner race and having an inner spherical surface in mating relation with the outer spherical surface of the inner race including:

a. a shaft member shaped to extend through and support the bearing inner race for motion therewith, b. first means to support and move said shaft member in oscillatory rotary motion about its longitudinal axis, c. support means adapted to support the bearing outer race in mating relation with the bearing inner race, d. second means to cause said outer race to oscillate about said inner race about a second axis perpendicular to the shaft longitudinal axis, e. and means to impose a load along an axis perpendicular to the shaft longitudinal axis and to the second axis so as to cause said support means and hence the bearing outer race to move with respect to the inner race.

21. A spherical bearing tester adapted to test spherical bearings which include an inner and an outer race having a spherical interface therebetween comprising:

a. means to support the inner bearing race, b. means to support the outer bearing race, c. means pivotally connecting said support means to permit load imposing relative pivotal motion therebetween and between said races, d. means to cause said inner race to oscillate about a first axis within the outer race, e. and means to cause the outer race to oscillate about a second axis perpendicular to the first axis with respect to the inner race.

22. A spherical bearing tester adapted to test spherical bearings which include an inner and an outer race having a spherical interface therebetween comprising:

a. means to support the inner bearing race, b. means to support the outer bearing race, c. means pivotally connecting said support means to permit load imposing relative pivotal motion therebetween and between said races, and wherein said load imposing means includes:

1. means to impart an oscillatory load to said outer race along an axis which is perpendicular to said first and second axes.

23. A spherical bearing tester adapted to test a spherical bearing which includes an inner race having a spherical outer surface and a center bore to receive the shaft on which the inner race is to be mounted and an outer race enveloping the inner race and having an inner spherical surface in mating relation with the outer spherical surface of the inner race including:

a. a shaft member adapted to extend through and support the bearing inner race for motion therewith, b. first means to support said shaft member for oscillatory rotary motion about its longitudinal axis, c. a support member adapted to support the bearing outer race in mating relation with the bearing inner race, d. second means to support said support member for oscillatory rotary motion about a second axis perpendicular to the shaft longitudinal axis, e. means to impose a load along an axis perpendicular to the shaft longitudinal axis and to the second axis so as to cause said support member and hence the bearing outer race to move with respect to the inner race, f. means to cause said shaft and hence the bearing inner race to oscillate about the shaft longitudinal axis, g. means to cause said support member and hence the bearing outer race to oscillate about said second axis, wherein said means to cause said shaft to oscillate and said means to cause said support member to oscillate are eccentric drive members.

24. A spherical bearing tester adapted to test a spherical bearing which includes an inner race having a spherical outer surface and a center bore to receive the shaft on which the inner race is to be mounted and an outer race enveloping the inner race and having an inner spherical surface in mating relation with the outer spherical surface of the inner race including:

a. a shaft member adapted to extend through and support the bearing inner race for motion therewith, b. first means to support said shaft member for oscillatory rotary motion about its longitudinal axis, c. a support member adapted to support the bearing outer race in mating relation with the bearing inner race, d. second means to support said support member for oscillatory rotary motion about a second axis perpendicular to the shaft longitudinal axis, e. means to impose a load along an axis perpendicular to the shaft longitudinal axis and to the second axis so as to cause said support member and hence the bearing outer race to move with respect to the inner race, f. means to cause said shaft and hence the bearing inner race to oscillate about the shaft longitudinal axis,
g. means to cause said support member and hence the bearing outer race to oscillate about said second axis, wherein said means to cause said shaft to oscillate and said means to cause said support member to oscillate are eccentric drive members, and further wherein said eccentric drive members include variable eccentric throws to vary the degree of oscillation.

25. A spherical bearing tester adapted to test spherical bearings which include an inner and an outer race having a spherical interface therebetween comprising:
a. means to support the inner bearing race,
b. means to support the outer bearing race,
c. means pivotally connecting said support means to permit load imposing relative pivotal motion, therebetween and between said races,
d. means to cause said inner race to oscillate about a first axis within the outer race,
e. means to cause the outer race to oscillate about a second axis perpendicular to the first axis with respect to the inner race, and
f. means to impart a load to said inner race along said first axis.

26. A spherical bearing tester adapted to test spherical bearings which include an inner and an outer race having a spherical interface therebetween comprising:
a. means to support the inner bearing race,
b. means to support the outer bearing race,
c. means pivotally connecting said support means to permit load imposing relative pivotal motion therebetween and between said races, and wherein said load imposing means includes:
1. means to impart an oscillatory load to said outer race along an axis which is perpendicular to said first and second axes, and wherein said load imposing means includes:
a. means to impart both a steady state and an oscillatory load across the bearing races.